(12) United States Patent
Weng

(10) Patent No.: US 6,631,625 B1
(45) Date of Patent: Oct. 14, 2003

(54) NON-HCFC REFRIGERANT MIXTURE FOR AN ULTRA-LOW TEMPERATURE REFRIGERATION SYSTEM

(75) Inventor: Chuan Weng, Weaverville, NC (US)

(73) Assignee: GSLE Development Corporation (DE Corp), Charlotte, NC (US)

( * ) Notice: Subject to any disclaimer, the term of this patent is extended or adjusted under 35 U.S.C. 154(b) by 0 days.

(21) Appl. No.: 10/305,188

(22) Filed: Nov. 27, 2002

(51) Int. Cl.[7] ............................................... F25B 39/04
(52) U.S. Cl. ............................ 62/509; 62/502; 62/513; 252/67
(58) Field of Search .................... 62/509, 512, 513, 62/114, 117, 502; 252/67

(56) References Cited

U.S. PATENT DOCUMENTS

| | | | | |
|---|---|---|---|---|
| 3,119,304 A | * | 1/1964 | Zeitz et al. ............... | 62/513 X |
| 3,613,387 A | * | 10/1971 | Collins ..................... | 62/113 X |
| 4,189,930 A | * | 2/1980 | Davydov et al. ............ | 62/502 |
| 4,788,829 A | * | 12/1988 | Takemasa et al. ......... | 62/512 X |
| 6,189,335 B1 | * | 2/2001 | Ebara et al. .............. | 62/513 X |

* cited by examiner

*Primary Examiner*—Harry B. Tanner
(74) *Attorney, Agent, or Firm*—Baker & Hostetler LLP

(57) ABSTRACT

Methods and apparatus for a refrigeration heat exchanger section useful in circulating a substantially non-HCFC refrigerant mixture which comprises: a compressor means, an auxiliary condenser, a first condenser, a second condenser, a third condenser, a subcooler and a liquid/gas separator, wherein a subcooled refrigerant liquid mixture taken as bottoms from the liquid/gas separator is distributed and expanded by a first expansion means and a second expansion means to form first and second expanded streams, respectively, such that the first expanded stream is returned to the auxiliary condenser and compressor in order to avoid overheating of the compressor.

13 Claims, 7 Drawing Sheets

NON-HCFC REFRIGERANT MIXTURE FOR AN ULTRA-LOW TEMPERATURE REFRIGERATION SYSTEM

FIELD OF INVENTION

The present invention relates generally to an apparatus for low temperature refrigeration systems. More particularly, the present invention elates to a non-hydrochlorofluorocarbon (non-HCFC) design of a refrigerant mixture for an ultra-low temperature refrigeration system.

BACKGROUND OF THE INVENTION

In refrigeration systems, a refrigerant gas is compressed in a compressor unit. Heat generated by the compression is then removed generally by passing the compressed gas through a water or air cooled condenser coil. The cooled, condensed gas is then allowed to rapidly expand into an evaporating coil where the gas becomes much colder, thus cooling the coil and the inside of the refrigeration system box around which the coil is placed.

Ultra-low and cryogenic temperatures ranging from $-95°$ C. to $-150°$ C. have been achieved in refrigeration systems using a single circuit vapor compressor. These systems typically use a single compressor to pump a mixture of four or five chlorofluorocarbon (CFC) containing refrigerants to reach an evaporative temperature of as low as $-160°$ C.

Environmental concern over the depletion of the ozonosphere has increased pressure on refrigerator manufacturers to substantially reduce the level of CFC-containing refrigerants used within their systems. Although non-CFC refrigerant mixtures have been developed, it has been discovered that most of these refrigerant mixtures cannot simply be substituted for CFC-containing refrigerants in currently available refrigeration systems due to the different thermodynamic properties of the refrigerants.

The present inventor has discovered that using non-CFC refrigerants in conventional ultra-low and cryogenic temperature systems cause an imbalanced flow of the refrigerants in the refrigeration circuit, which reduces the cooling capability of the refrigerants to the compressor. Such low levels of compressor cooling can cause a system to fail due to compressor overheating.

Furthermore, given that HCFC refrigerants do contain chlorine, that over time can affect the ozone layer as well as CFC refrigerants, the present inventor has developed a novel autocascade ultra-low and cryogenic temperature refrigeration system which is capable of operating with non-HCFC refrigerant mixtures. These non-HCFC refrigerant mixtures are non-toxic, chemically stable, commercially available and compatible with most of the standard refrigeration oils and compressor materials. Normally, one component of a non-CFC refrigerant mixture, i.e., hydrochlorofluorocarbon (HCFC), is a regulated ozone depleting chemical. However, the present invention uses a non-HCFC refrigerant mixture which has no ozone depleting properties at all, i.e., the mixture is primarily composed of hydrofluorocarbon (HFC) refrigerants and hydrocarbons.

As shown in FIG. 7, an index called the Ozone Depletion Potential (ODP) has been adopted for regulatory purposes. The ODP of a compound is an estimate of the total ozone depletion due to 1 Kg of the compound divided by the total ozone depletion due to 1 Kg of CFC-11 refrigerant. Thus, the ODP shows relative effects of comparable emissions of the various compounds.

Unlike the CFC-containing refrigeration systems which do not cause overheating of the compressor, the present inventor has discovered that the substantially non-HCFC refrigeration systems must provide additional liquid return to the compressor in order to avoid overheating thereof and eventual failure of the system.

The present inventor has been able to overcome the overheating of the compressor when using substantially non-HCFC refrigerants in a single compressor autocascade system. This is accomplished by providing a specially-designed capillary tube or expansion means disposed downstream of the first liquid/gas separator such that liquid refrigerants are returned directly to the auxiliary condenser and then to the compressor. This feature enables larger than normal quantities of refrigerants of higher boiling points to be rapidly returned to the compressor, which results in excellent operating conditions of the compressor and avoids overheating thereof.

As such, the overall performance of the non-HCFC autocascade system is comparable to its counterpart of the CFC autocascade system. This is evidenced by the fact that both systems have similar pull down rates and compressor operating conditions at standard $90°$ F. ambient.

The present invention also provides many additional advantages which shall become apparent as described below.

SUMMARY OF THE INVENTION

The present invention overcomes the need for using CFC or HCFC refrigerant mixtures in a refrigeration system by utilizing refrigerants R14, R23, R50, R116, R134a, R152a, R170, R236fa, R236ea, R245fa, R245ca, RC318, R290, RR508a, R508b, R600, R600a, R740 and R 1150 in various 5, 6 and 7-component mixtures. To achieve desired properties, these refrigerants may be used in a "cocktail" mixture (e.g., R600a or R600; R290; R170 or R 1150; R50; and R740).

It is therefore a feature of the present invention to provide a non-HCFC ultra-low temperature refrigerant mixture that can safely be applied in the field as needed without the risks associated with CFC or HCFC ultra-low temperature refrigerants.

It is another feature of the present invention to provide a refrigeration heat exchanger section which is capable of circulating a substantially non-HCFC refrigerant mixture which comprises: a compressor means, an auxiliary condenser, a first condenser, a second condenser, a third condenser, a subcooler means and a liquid/gas separator, wherein the improvement is characterized by: a means for distributing a subcooled refrigerant liquid mixture from the liquid/gas separator to a first expansion means and a second expansion means for forming first and second expanded streams, respectively; and a first conduit means for returning the first expanded stream to the auxiliary condenser and the compressor; and a second conduit means for delivering the second expanded stream to the first condenser.

More specifically, the refrigeration heat exchanger section preferably comprises: a compressor means; an auxiliary condenser connected to receive and cool the refrigerant mixture discharged from the compressor means; a first liquid/gas separator connected to received the cooled refrigerant mixture discharged from the auxiliary condenser, wherein a subcooled refrigerant liquid mixture is taken as bottoms and a gaseous refrigerant liquid mixture is taken overhead; a means for distributing the subcooled refrigerant liquid mixture to a first expansion means and a second expansion means to form a first expanded stream and a second expanded stream, respectively; a first conduit means for returning the first expanded stream to the auxiliary condenser and the compressor.

The high pressure flow of the heat exchanger circuit further comprises: a first condenser connected to receive the gaseous refrigerant mixture from the liquid/gas separator; a second liquid/gas separator connected to receive the gaseous refrigerant mixture from the first condenser, wherein a subcooled liquid refrigerant mixture is taken as bottoms and a gaseous refrigerant mixture is taken overhead; a second condenser connected to receive the gaseous refrigerant mixture which is taken overhead from the second liquid/gas separator; a third condenser connected to receive at least a portion of the gaseous refrigerant mixture taken from the second condenser; and a subcooler means connected to receive the gaseous refrigerant mixture from the third condenser.

The low pressure flow of the heat exchanger circuit further comprises: a distributor means connected to receive the refrigerant mixture from the subcooler means, the distributor means is capable of separating the refrigerant mixture into a first stream and a second stream; a third expansion means connected to receive the first stream, thereby forming a third expanded stream; a third conduit means for delivering the third expanded stream to the subcooler means; a fourth expansion means connected to received the second stream, thereby forming a fourth expanded stream; a fourth conduit means for delivering the fourth expanded stream to a storage tank; a fifth conduit means for delivering the fourth expanded stream from the storage tank to the third condenser; a sixth conduit means disposed between the third condenser and the second condenser such that the fourth expanded stream from the third condenser is delivered to the second conduit means; a sixth expansion means connected to receive the subcooled liquid refrigerant mixture from the second liquid/gas separator, thereby forming a fifth expanded stream; a seventh conduit means for delivering the fifth expanded stream to the second condenser; an eighth conduit means for delivering the fifth expanded stream from the second condenser to the first condenser; a second conduit means for delivering the second expanded stream to the first condenser; a ninth conduit means for delivering the second expanded stream and the fifth expanded stream from the first condenser to the auxiliary condenser; and a tenth conduit means for delivering the first, second and fifth expanded streams from the auxiliary condenser to the compressor.

There has been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of he invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purposes of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent construction insofar as they do not depart from the spirit and scope of the present invention.

DETAILED DESCRIPTION OF PREFERRED EMBODIMENTS OF THE INVENTION

Figure 1:
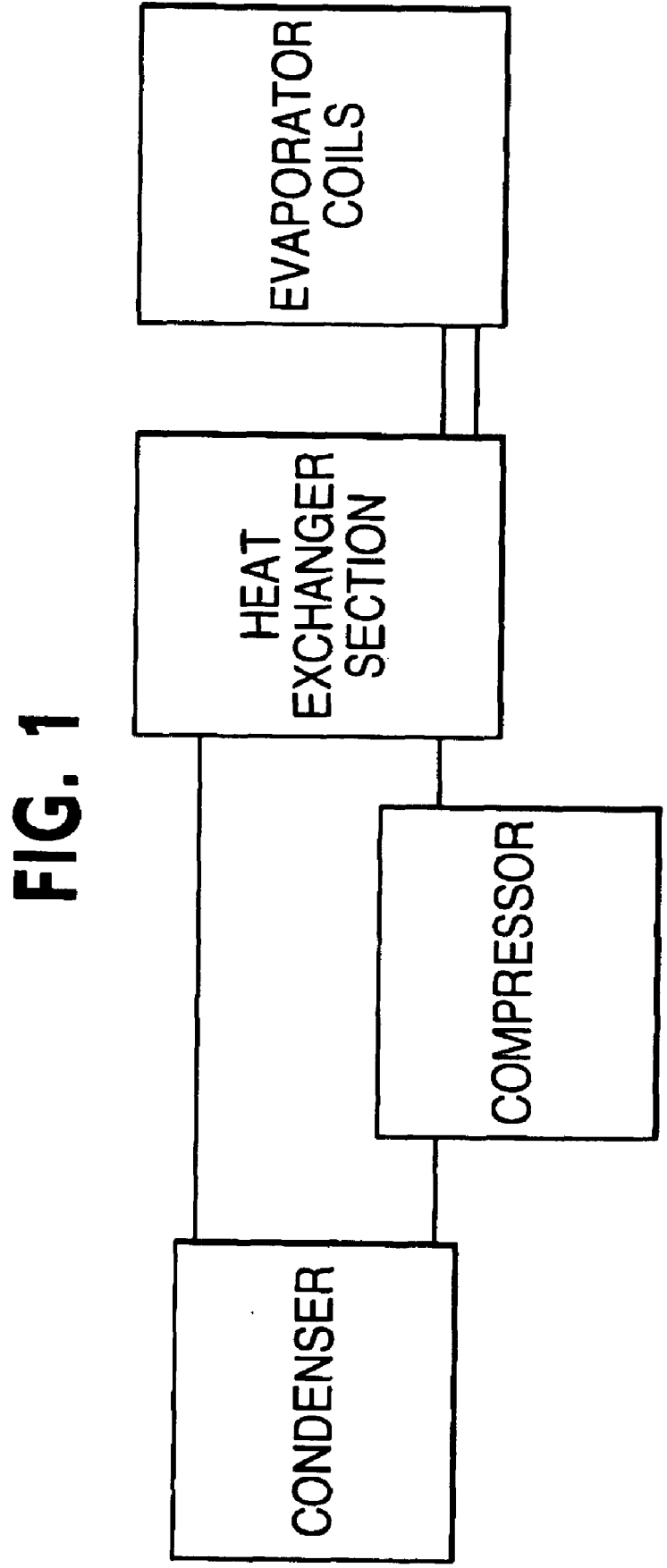
FIG. 1 is a block diagram of the single compressor refrigeration system according to the present invention.

Referring now to the Figures, in FIG. 1 there is shown a Single compressor ultra-low and cryogenic temperature refrigeration systems, as shown in FIG. 1, pump refrigerants through a condenser, heat exchanger section and evaporator coils in a closed circuit loop to provide temperatures as low as −150 °C. The heat exchanger section and evaporator coils referred to in FIG. 1 are specifically described in FIG. 2. The conventional refrigeration compressor and condenser referred to in FIG. 1 are not shown in FIG. 2. The air-cooled or water-cooled condenser cools the compressor and removes BTU's from the refrigerant by partially changing the refrigerant mixture from vapor to liquid, whereas the liquid/gas separator separates liquid refrigerant from vapor and returns lubricating oil to the compressor. The heat exchangers use the thermophysical properties of the refrigerants to effect the cooling process. The evaporator coils permit the flow of refrigerant at ultra-low temperatures to absorb heat from the freezer interior, delivering this heat to the condenser for removal.

For example, a non-HCFC refrigerant mixture used with this system is the combination of five refrigerants R-134a ($CF_3CFH_2$); R-23 ($CHF_3$) or R-508 (R-23 +R-116b); R-14 ($CF_4$); R-600 ($C_4F_{10}$) or R-600a ($CH(CH_3)_3$); and R-740 (argon, Ar). The −95° C. systems use a similar heat exchanger configuration. The following Table 1-1 is arranged and grouped by refrigerant normal boiling points (NBP).

TABLE 1-1

| Refrigerants ASHRAE # | NBP 44 F. to 78 F. | NBP 4 F. to 30 F. | NBP −13 F. to −43.7 F. | NBP −108 F. to −154 F. | NBP −198 F. | NBP −258 F. | NBP −302 F. |
|---|---|---|---|---|---|---|---|
| R14 | | | | | E | | |
| R23 | | | | D | | | |

TABLE 1-1-continued

| Refrigerants ASHRAE # | NBP 44 F. to 78 F. | NBP 4 F. to 30 F. | NBP −13 F. to −43.7 F. | NBP −108 F. to −154 F. | NBP −198 F. | NBP −258 F. | NBP −302 F. |
|---|---|---|---|---|---|---|---|
| R50 | | | | | F | | |
| R116 | | | | D | | | |
| R134a | | | C | | | | |
| R152a | | | C | | | | |
| R170 | | | | D | | | |
| R236ea | A | | | | | | |
| R236fa | | B | | | | | |
| R227ea | | B | | | | | |
| R245ca | A | | | | | | |
| R245fa | A | | | | | | |
| R508a | | | | D | | | |
| R508b | | | | D | | | |
| R600 | | B | | | | | |
| R600a | | B | | | | | |
| R740 | | | | | | | G |
| R1150 | | | | D | | | |
| RC318 | | B | | | | | |
| R290 | | | C | | | | |

(Note: NBP = Normal Boiling Point)

Other possible non-HCFC refrigerant mixture combinations are as follows from Table 1-1:

Mixture 1: A+C+D+E+F+G
Mixture 2: A+C+D+E+G
Mixture 3: A+C+D+F+G
Mixture 4: B+C+D+E+F+G
Mixture 5: B+C+D+E+G
Mixture 6: B+C+D+F+G
Mixture 7: A+B+D+E+F+G
Mixture 8: A+B+D+E+G
Mixture 9: A+B+D+F+G
Mixture 10: A+B+C+D+E+F+G
Mixture 11: A+B+C+D+E+G
Mixture 12: A+B+C+D+F+G It should be noted that G (R-740) is required in all of the above non-HCFC refrigerant mixtures (see Table 1-1). These combinations are for −140° C./−150°C. freezers in which one refrigerant can be pulled out of each alphabetical group A to G (see Table 1-1) in order to make a viable mixture.

For freezers operating between −60° C. to −95° C., the mixture combinations would exclude group G (R-740). Each mixture combination has a workable composition range of about ±10% per refrigerant. For example, if a mixture is a 5-component mixture, (e.g., Mixture 8, A+B+D+E+G) then the composition for a component would be about 10 to 30 percent by volume.

Figure 2:
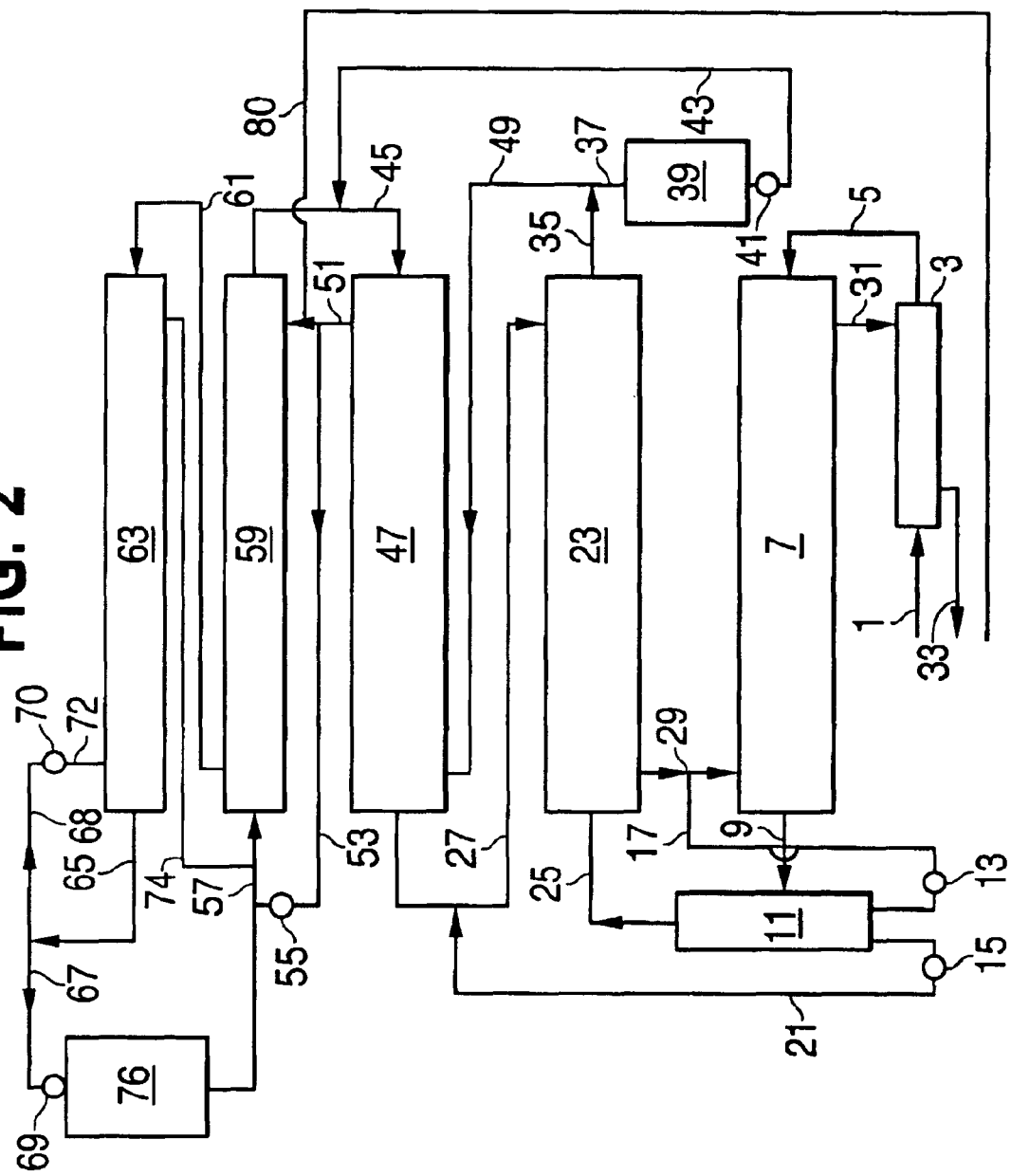
FIG. 2 is a non-HCFC autocascade heat exchanger section according to the present invention.

FIG. 2 is a schematic diagram for a −150° C. non-HCFC autocascade heat exchanger section, wherein a mixture of non-HCFC refrigerant is pumped from liquid line 1 taken from the condenser shown in FIG. 1 through liquid/suction heat exchanger 3 to produce a mixture of gases and liquids at 225 psi and room temperature. This liquid/gas mixture is then pumped through auxiliary condenser 7 via conduit 5 and exits therefrom via conduit 9. After flowing through auxiliary condenser 7 the liquid/gas mixture reaches a temperature of approximately −10° F.

For example, at −10° F. and a pressure of about 220 psi, refrigerants R-600, R-134a and R-23 become subcooled liquids, and sink to the bottoms of a vertically-mounted liquid/gas separator 11. The subcooled liquid mixture is then distributed and expanded by two capillary tube 13 and 15. The expanded liquid flows from capillary tube 13 and 15 to conduits 17 and 21, respectively, to join the return flow of low pressure refrigerant fluids.

Meanwhile, R-14 and R-740, along with traces of the other refrigerants of higher boiling points, continue to flow through the tube side of first condenser 23 via conduit 25. The temperature of the R-14 and R-740 after passing through first condenser 23 is approximately −67° F. The traces of R-23 are subcooled to a liquid phase after passing through first condenser 23 such that it passes from conduits 35 and 37 into liquid/gas separator 39.

Liquid R-23 and some gases are expanded by capillary tube 41 and pumped via conduits 43 and 45 to the tube side of second condenser 47. After passing through second condenser 47, the liquid R-23 is mixed in conduit 27 with the expanded mixture from conduit 21 and returned to the shell side of first condenser 23.

The R-14 and argon gas exiting first condenser 23 via conduit 35 are pumped via conduit 49 to the shell side of second condenser 47, exiting therefrom via conduit 51 at a typical temperature of −130°F. This temperature and the high side pressure of 215 psig allow a portion of the R-14 to be subcooled and sent via conduit 53 to capillary tube 55 where it is expanded and pumped via conduit 57 to cool the tube side of third condenser 59. However, a majority of the R-14 and R-740 are passed through the shell side of third condenser 59 to conduit 61 and into the tube side of subcooler 63. Most of the R-14 and R-740 exit subcooler 63 via conduit 65 at a temperature of −220°F. These gases are distributed via conduits 67 and 68 to capillary tube 69 and 70, respectively, where they are expanded to achieve a final temperature of −260° F. The expanded R-14 and R-740 from capillary tube 70 enter the shell side of subcooler 63 via conduit 72 to cool the gases passing through the tube side of subcooler 63. These gases then exit subcooler 63 via conduit 74 and are joined in conduit 57 with the expanded gases contained in reservoir or storage tank 76 (i.e., this constitutes the evaporator coils of FIG. 1) and expanded gases from capillary tube 55 before passing through the tube side of third condenser 59.

A portion of the R-14 and R-740 which exit second condenser 47 via conduit 51 are diverted via conduit 80 to an expansion tank section (not shown) as needed to prevent overpressure of the system during pull down and heavy loading situations.

Contemporaneously, the expanded liquid from capillary tube 15 is plumped via conduit 21 to conduit 27 wherein it flows to the shell side of first condenser 23. The shell side liquid of first condenser 23 is then merged with the expanded liquid from conduit 17 in conduit 29 and sent to the shell side of auxiliary condenser 7. The expanded liquid from conduit 29 exits auxiliary condenser 7 via conduit 31 and passes along the shell side of liquid/suction heat exchanger 3 where it is sent via suction line 33 to a single compressor (i.e., shown in FIG. 1). The compressor referred to in FIG. 1 compresses the expanded liquid and delivers the compressed liquid the condenser of FIG. 1 so as to complete the closed loop circuit of FIG. 1. The use of capillary tube 13 allows liquid phase refrigerants R-600 and R-134a to continue the journey of evaporation within auxiliary condenser 7 and liquid/suction heat exchanger 3, giving an appropriate return condition to prevent the compressor (not shown) from overheating. Simultaneously, capillary tube 15 will dispatch enough liquid for the cooling of first condenser 23. The use of an additional capillary tube 13 to return refrigerants R-600 and R-134a to the compressor accommodates the different thermodynamic properties of the non-HCFC refrigerants. Otherwise, sufficient liquid refrigerants would not be returned to the compressor to avoid overheating, thereby causing failure of the refrigeration system.

Figure 3:
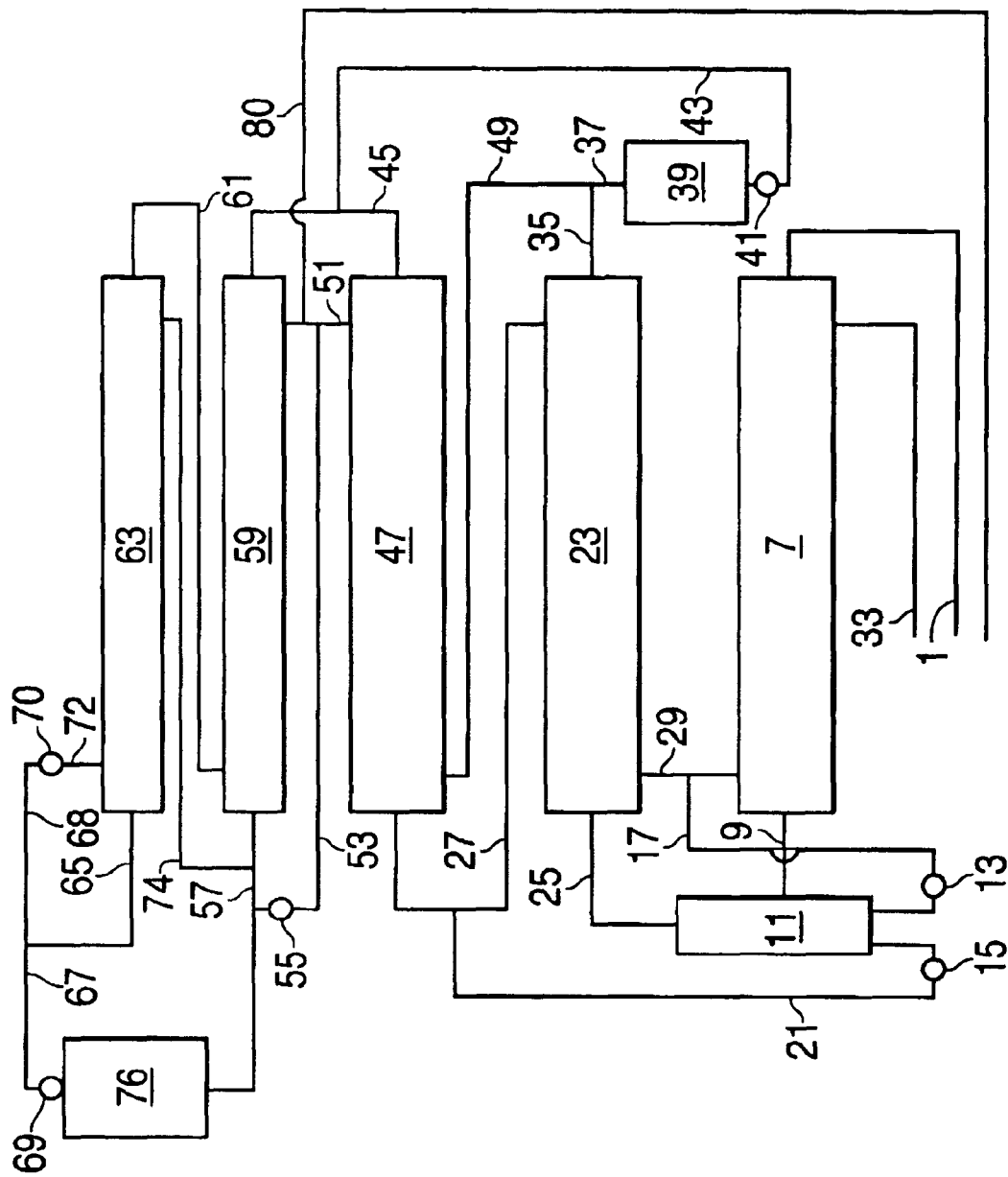
FIG. 3 is a non-HCFC autocascade heat exchanger section in accordance with another embodiment of the present invention.

FIG. 3 is a schematic diagram for a −95° C. and −120° C. non-HCFC autocascade heat exchanger section. This is similar to the heat exchange configuration of the −150° C. non-HCFC system, except that the refrigerant charges do not include argon in −95° C. models and have less argon gas in −120° C. models. The warmer temperatures of these models make it possible to avoid the expense of a liquid/suction heat exchanger disposed about suction line 33 and liquid line 1.

Figure 4:
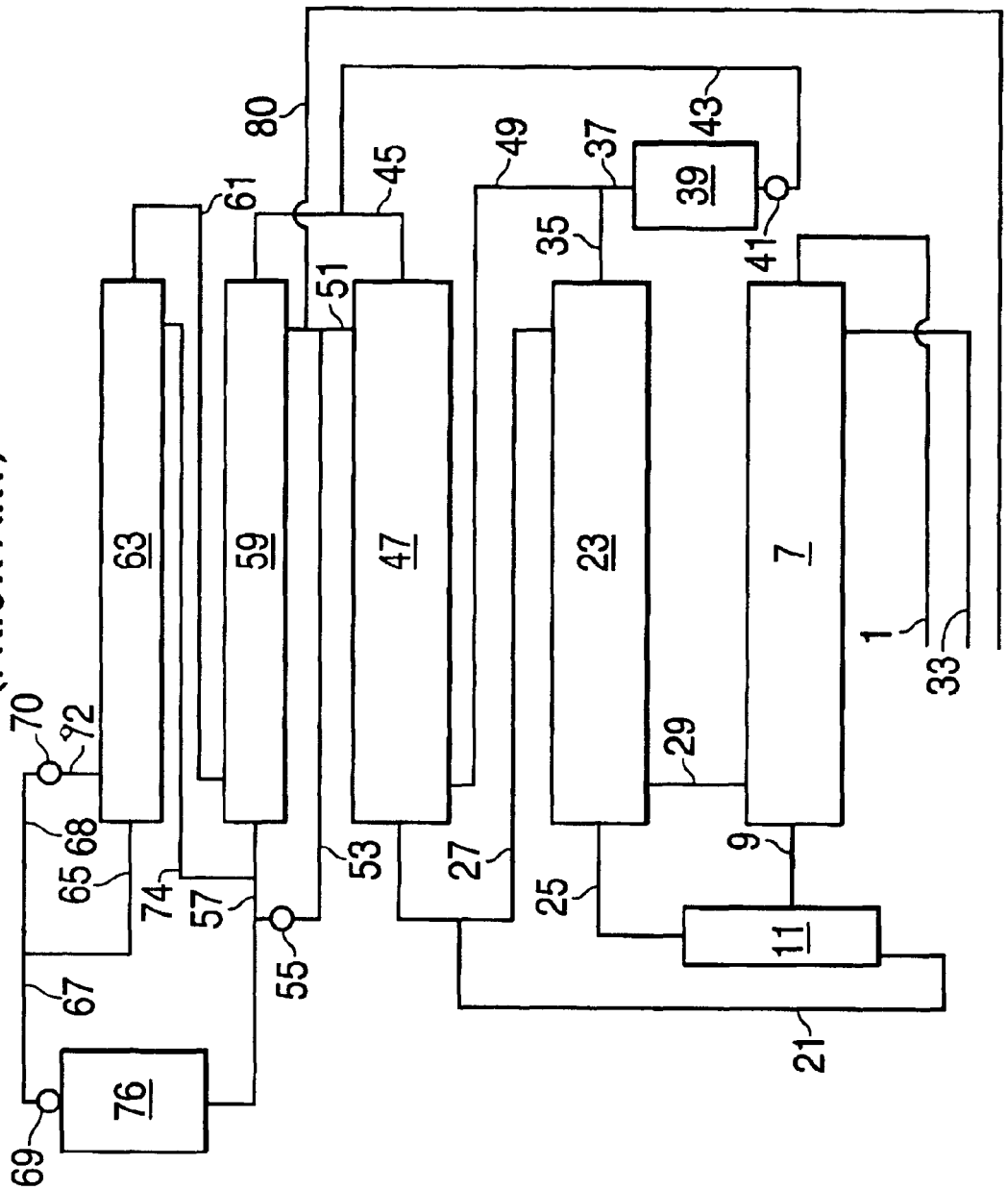
FIG. 4 is a conventional CFC-based autocascade heat exchanger section.

FIG. 4 depicts a conventional CFC-autocascade heat exchanger section which is similar to the non-HCFC systems shown in FIGS. 2 and 3, except that the subcooled liquid from liquid/gas separator 11 is only distributed and expanded via one capillary tube to the shell side of the first condenser for cooling of the first condenser, second condenser and the compressor. As such, the conventional CFC system of FIG. 4 would cause the compressor to overheat, if used with the non-HCFC refrigerants, and eventually result in a system failure.

Conversely, if a CFC refrigerant is added to the non-HCFC autocascade refrigeration systems according to the present invention, then the thermodynamic operation of the system would be completely disrupted by returning too much liquid to the auxiliary condenser and thus causing the compressor to be flooded and eventual failure of the compressor.

Figure 5:
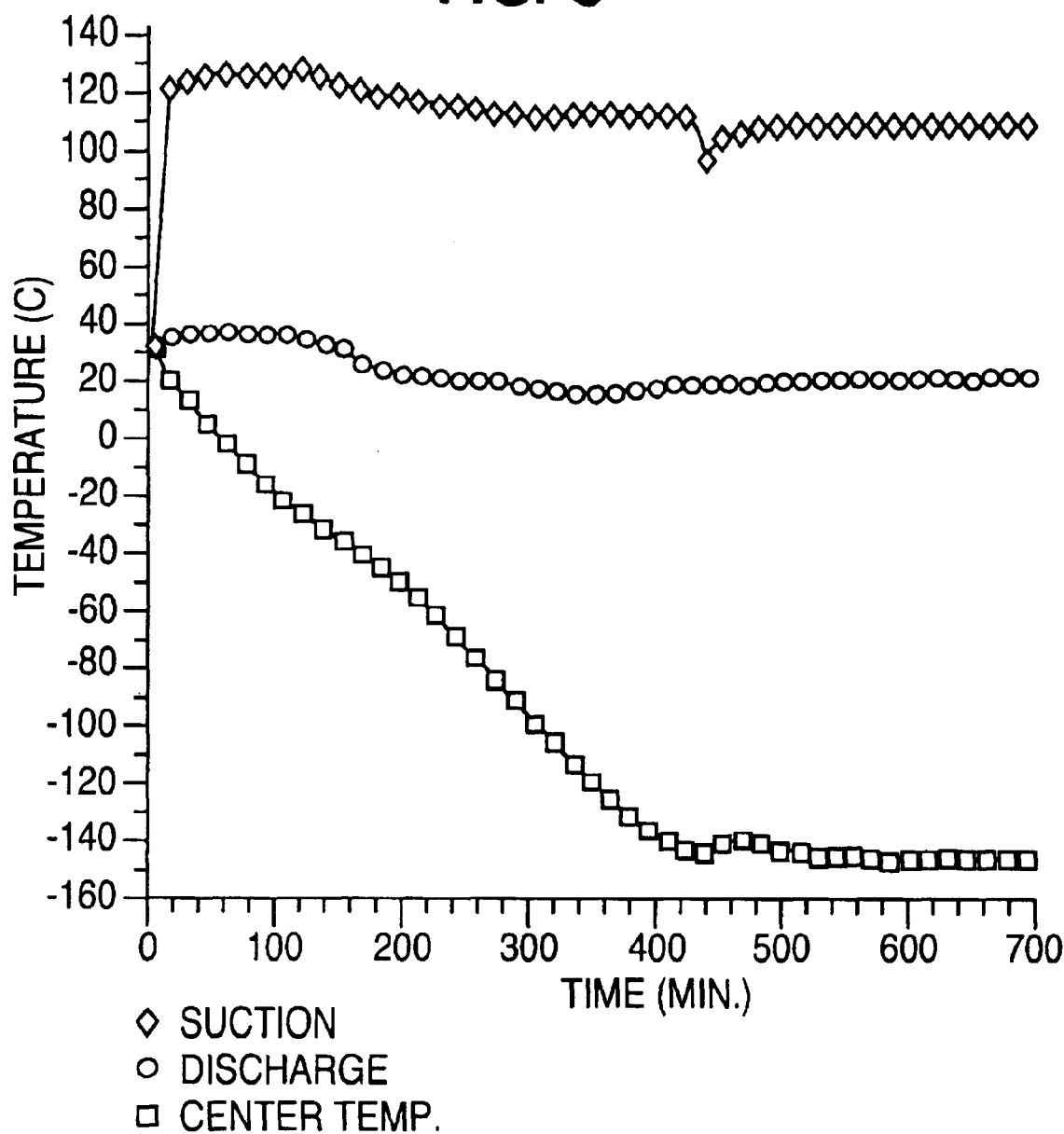
FIG. 5 is a graph depicting the pull down rates of CFC refrigerants in a conventional autocascade system at 90° F. ambient.
Figure 6:
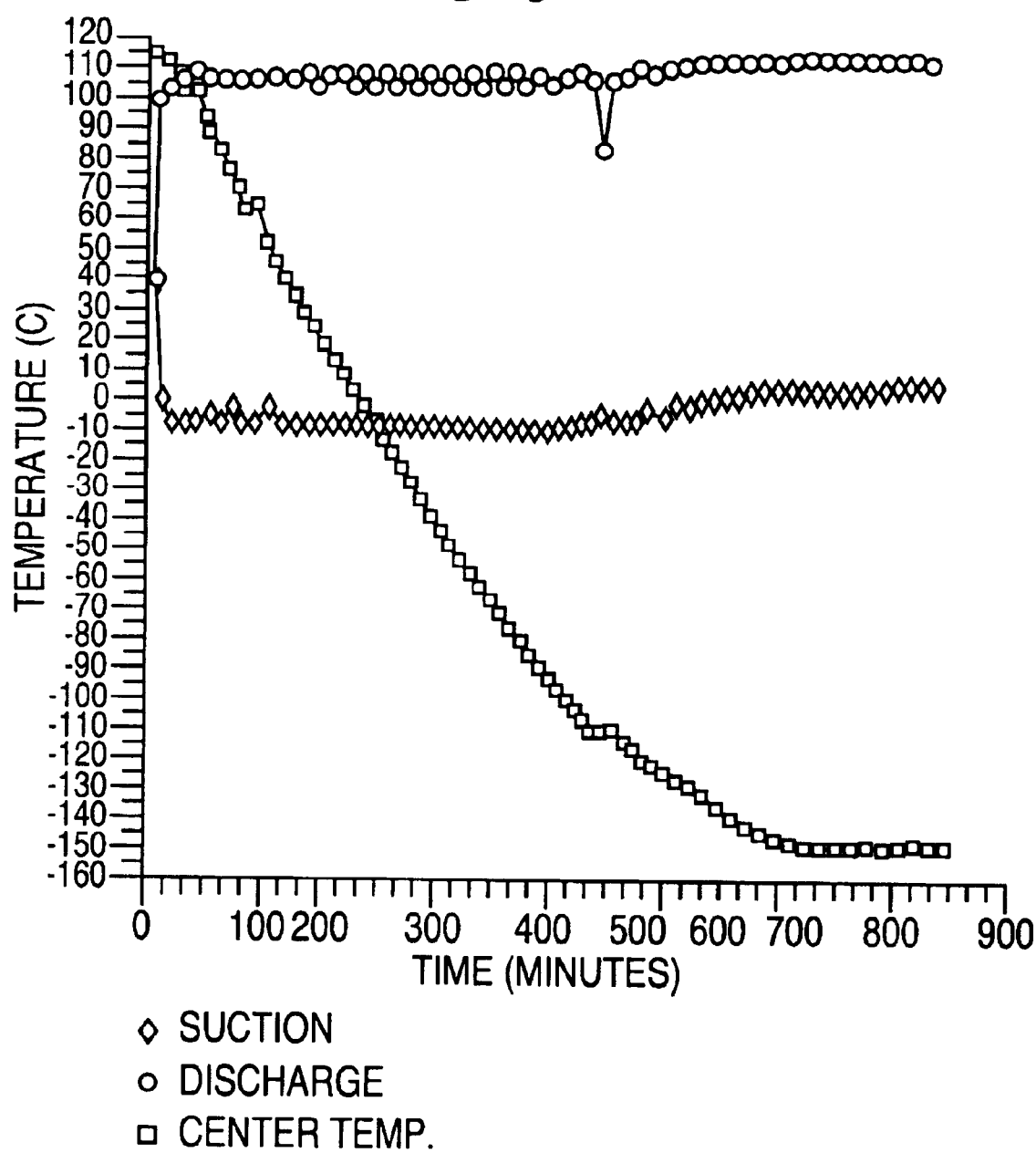
FIG. 6 is a graph depicting the pull down rates of non-HCFC refrigerants in an autocascade system according to the present invention at 90° F. ambient.
Figure 7:
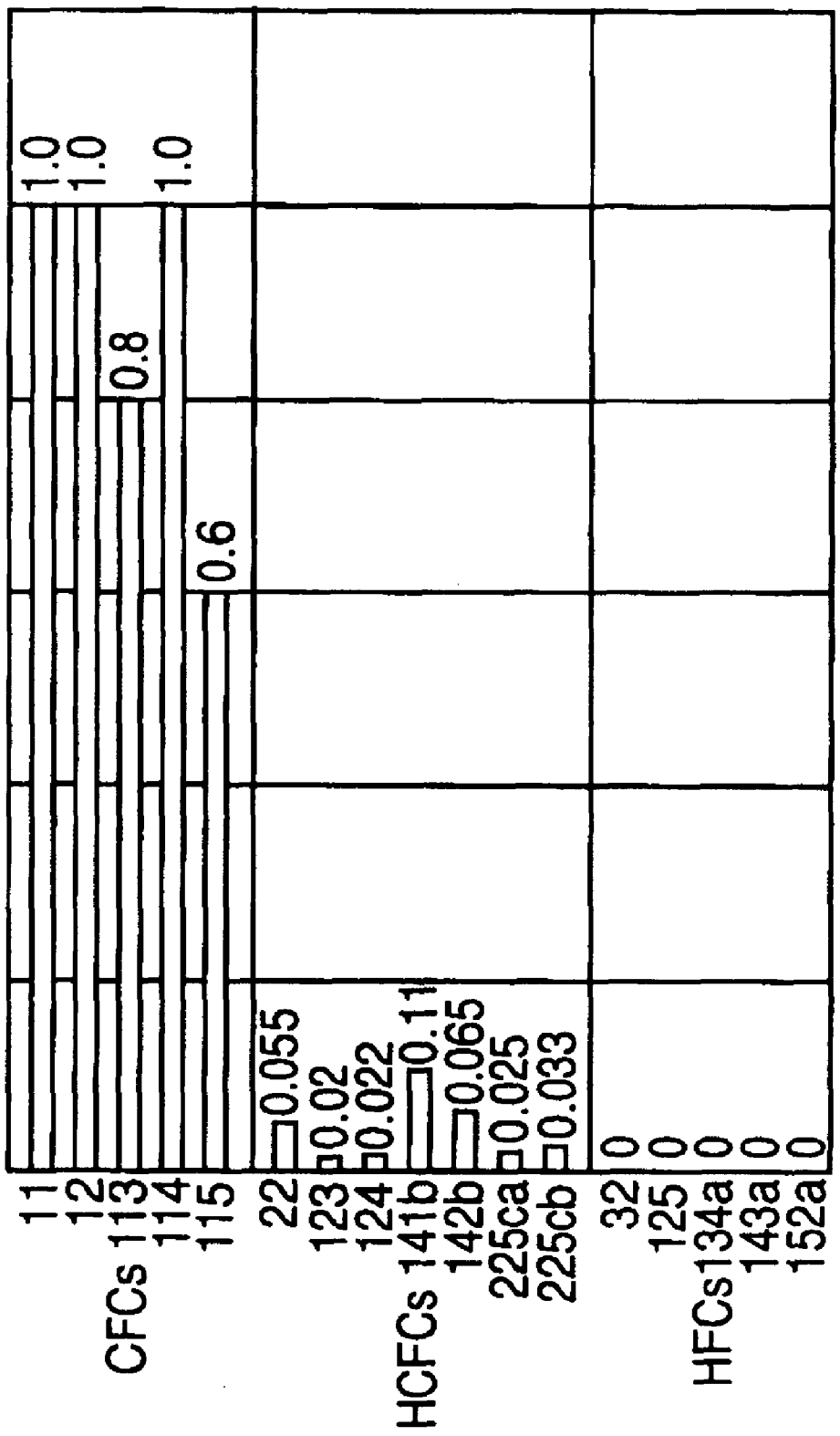
FIG. 7 illustrates the Ozone Depletion Potentials of CFC, HCFC and HFC refrigerants.

FIGS. 5 and 6 clearly show that the pull down rates at 90° F. ambient are similar for both the conventional CFC autocascade system and the non-HCFC autocascade system according to the present invention. For example, both systems exhibit a pull down rate at discharge after 600 minutes of about 0.192° C./min. The suction pull down rate after 600 minutes is about 0.033°C./min. for the CFC system and about 0.008°C./min. for the non-HCFC system. Finally, the pull down rate at the center temperature after 600 minutes is about 0.24° C./min. for both systems.

It should be noted that the lower temperatures at suction, as exhibited in the non-HCFC system, are highly desirable since these lower temperatures assist in the cooling of the compressor.

The above description and drawings are only illustrative of preferred embodiments which achieve the objects, features, and advantages of the present invention, and it is not intended that the present invention be limited thereto. Any modification of the present invention which comes within the spirit and scope of the following claims is considered to be part of the present invention.

What is claimed is:

1. A refrigeration heat exchanger section useful in circulating a non-hydrochlorofluorocarbon refrigerant mixture which comprises: a compressor means, an auxiliary condenser connected to said compressor means, a liquid/gas separator connected to said auxiliary condenser, a first condenser connected to said liquid/gas separator, a second condenser connected to said first condenser, a third condenser connected to said second condenser, and a subcooler means connected to said third condenser, wherein the improvement is characterized by:

a means for distributing a subcooled non-hydrochlorofluorocarbon refrigerant liquid mixture from said liquid/gas separator to a first expansion means and a second expansion means for forming first and second expanded streams, respectively;

a first conduit means for returning said first expanded stream to said auxiliary condenser and said compressor; and a second conduit means for delivering said second expanded stream to said first condenser.

2. The refrigeration heat exchanger section according to claim 1, wherein said non-hydrochlorofluorocarbon refrigerant mixture comprises:

R14;

any one refrigerant from the group consisting of R134a; R152a and R290;

any one refrigerant from the group consisting of R227ea, R236fa, RC318, R600 and R600a; and any one refrigerant from the group consisting of R23, R116, R170, R508a, R508b and R1150.

3. The refrigeration heat exchanger section according to claim 1, wherein said non-hydrochlorofluorocarbon refrigerant mixture comprises:

R14;

any one refrigerant from the group consisting of R134a; R152a and R290;

any one refrigerant from the group consisting of R236ea, R245ca and R245fa; and any one refrigerant from the group consisting of R23, R116, R170, R508a, R508b and R1150.

4. The refrigeration heat exchanger section according to claim 1, wherein said non-hydrochlorofluorocarbon refrigerant mixture comprises:

R14;

R50;

any one refrigerant from the group consisting of R134a; R152a and R290;

any one refrigerant from the group consisting of R236ea, R245ca and R245fa; and any one refrigerant from the group consisting of R23, R116, R170, R508a, R508b and R1150.

5. The refrigeration heat exchanger section according to claim 1, wherein said non-hydrochlorofluorocarbon refrigerant mixture comprises:

R14;

R50;

any one refrigerant from the group consisting of R134a; R152a and R290;

any one refrigerant from the group consisting of R227ea, R236fa, RC318, R600 and R600a; and any one refrigerant from the group consisting of R23, R116, R170, R508a, R508b and R1150.

6. The refrigeration heat exchanger section according to claim 1, wherein said non-hydrochlorofluorocarbon refrigerant mixture comprises:

R50;

any one refrigerant from the group consisting of R134a, R152a and R290;

any one refrigerant from the group consisting of R227ea, R236fa, RC318, R600 and R600a; and any one refrigerant from the group consisting of R23, R116, R170, R508a, R508b and R1150.

7. The refrigeration heat exchanger section according to claim 1, wherein said non-hydrochlorofluorocarbon refrigerant mixture comprises:

R14;

R50;

any one refrigerant from the group consisting of R236ea, R245ca and R245fa;

any one refrigerant from the group consisting of R227ea, R236fa, RC318, R600 and R600a;

any one refrigerant from the group consisting of R134a, R152a and R290; and any one refrigerant from the group consisting of R23, R116, R170, R508a, R508b and R1150.

8. The refrigeration heat exchanger section according to claim 1, wherein said non-hydrochlorofluorocarbon refrigerant mixture comprises:

R50;

any one refrigerant from the group consisting of R236ea, R245ca and R245fa;

any one refrigerant from the group consisting of R227ea, R236fa, RC318, R600 and R600a;

any one refrigerant from the group consisting of R134a, R152a and R290; and any one refrigerant from the group consisting of R23, R116, R170, R508a, R508b and R1150.

9. The refrigeration heat exchanger section according to claim 1, wherein said non-hydrochlorofluorocarbon refrigerant mixture comprises:

R14;

any one refrigerant from the group consisting of R134a; R152a and R290;

any one refrigerant from the group consisting of R227ea, R236fa, RC318, R600 and R600a;

any one refrigerant from the group consisting of R236ea, R245ca and R245fa; and any one refrigerant from the group consisting of R23, R116, R170, R508a, R508b and R1150.

10. The refrigeration heat exchanger section according to claim 1, wherein said non-hydrochlorofluorocarbon refrigerant mixture comprises:

R14;

R50;

any one refrigerant from the group consisting of R236ea, R245ca and R245 fa;

any one refrigerant from the group consisting of R227ea, R236fa, RC318, R600 and R600a; and any one refrigerant from the group consisting of R23, R116, R170, R508a, R508b and R1150.

11. The refrigeration heat exchanger section according to claim 1, wherein said non-hydrochlorofluorocarbon refrigerant mixture comprises:

R14;

any one refrigerant from the group consisting of R227ea, R236fa, RC318, R600 and R600a;

any one refrigerant from the group consisting of R236ea, R245ca and R245fa; and any one refrigerant from the group consisting of R23, R116, R170, R508a, R508b and R1150.

12. The refrigeration heat exchanger section according to claim 1, wherein said non-hydrochlorofluorocarbon refrigerant mixture comprises:

R50;

any one refrigerant from the group consisting of R134a; R152a and R290;

any one refrigerant from the group consisting of R236ea, R245ca and R245fa; and any one refrigerant from the group consisting of R23, R116, R170, R508a, R508b and R1150.

13. The refrigeration heat exchanger section according to claim 1, wherein said non-hydrochlorofluorocarbon refrigerant mixture comprises:

R50;

any one refrigerant from the group consisting of R227ea, R236fa, RC318, R600 and R600a;

any one refrigerant from the group consisting of R236ea, R245ca and R245fa; and any one refrigerant from the group consisting of R23, R116, R170, R508a, R508b and R1150.

* * * * *